(12) United States Patent
Maw et al.

(10) Patent No.: US 10,337,261 B2
(45) Date of Patent: Jul. 2, 2019

(54) UNIVERSAL JOINT

(71) Applicant: Ulterra Drilling Technologies, L.P., Fort Worth, TX (US)

(72) Inventors: Jason Maw, Beaumont, CA (US); Beau J. St. Pierre, Hudson Oaks, TX (US); Nikolai Kummer, Edmonton (CA)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 221 days.

(21) Appl. No.: 15/268,618

(22) Filed: Sep. 18, 2016

(65) Prior Publication Data

US 2017/0081928 A1 Mar. 23, 2017

Related U.S. Application Data

(60) Provisional application No. 62/220,846, filed on Sep. 18, 2015.

(51) Int. Cl.
| | | |
|---|---|---|
| *E21B 17/05* | (2006.01) | |
| *F16D 3/62* | (2006.01) | |
| *E21B 4/00* | (2006.01) | |
| *E21B 7/06* | (2006.01) | |
| *F16D 3/72* | (2006.01) | |

(52) U.S. Cl.
CPC .............. *E21B 17/05* (2013.01); *E21B 4/006* (2013.01); *E21B 7/068* (2013.01); *F16D 3/62* (2013.01); *F16D 3/72* (2013.01)

(58) Field of Classification Search
CPC . E21B 17/04; E21B 17/05; F16D 3/62; F16D 3/72
See application file for complete search history.

(56) References Cited

U.S. PATENT DOCUMENTS

| | | | |
|---|---|---|---|
| 763,127 A | 6/1904 | Tilden | |
| 1,261,962 A | 4/1918 | Scott | |
| 1,314,990 A | 9/1919 | Stockwell | |
| 1,324,063 A | 12/1919 | Noel | |
| 1,337,646 A * | 4/1920 | Eckart | F16D 3/12 279/16 |

(Continued)

FOREIGN PATENT DOCUMENTS

| | | |
|---|---|---|
| DE | 2730486 A1 | 1/1979 |
| EP | 0048564 A2 | 3/1982 |

(Continued)

OTHER PUBLICATIONS

Final Office Action received from the U.S. Patent and Trademark Office in U.S. Appl. No. 14/838,155, dated Jul. 5, 2017, 7 pages.

(Continued)

*Primary Examiner* — Shane Bomar
(74) *Attorney, Agent, or Firm* — Kilpatrick Townsend & Stockton LLP

(57) ABSTRACT

A universal joint assembled to a drill string transfers torque and axial force between two components along a longitudinal axis where the shafts of the components are not completely aligned. The universal joint includes axially spaced members joined by transversely spaced links. As the joint rotates the links move to accommodate misalignment between the drill string components and the connected members.

26 Claims, 4 Drawing Sheets

(56) References Cited

U.S. PATENT DOCUMENTS

| | | | |
|---|---|---|---|
| 1,355,516 A | | 10/1920 | Rodolphe |
| 1,362,646 A | | 12/1920 | Stockwell |
| 1,369,349 A | * | 2/1921 | Murphy ................ F16D 3/72 |
| | | | 464/84 |
| 1,373,393 A | | 3/1921 | Langworthy |
| 1,376,504 A | | 5/1921 | Behn |
| 1,421,072 A | | 6/1922 | Emet |
| 1,479,755 A | | 1/1924 | Stokes |
| 1,488,291 A | | 3/1924 | Schell |
| 1,550,458 A | | 8/1925 | Schell |
| 1,647,240 A | * | 11/1927 | McDonald ............... E21B 1/00 |
| | | | 175/207 |
| 1,897,542 A | * | 2/1933 | West ...................... B60K 17/22 |
| | | | 180/339 |
| 1,950,448 A | * | 3/1934 | Heisterkamp ............ F16D 3/72 |
| | | | 464/57 |
| 1,956,733 A | * | 5/1934 | Small ..................... G11B 15/46 |
| | | | 188/187 |
| 1,960,092 A | * | 5/1934 | Taylor .................... F16D 13/70 |
| | | | 192/111.1 |
| 2,025,825 A | | 12/1935 | Louis |
| 2,217,969 A | | 10/1940 | Scheirer |
| 2,301,659 A | | 11/1942 | Louis |
| 2,319,027 A | | 5/1943 | Aker |
| 2,491,820 A | | 12/1949 | Leibing et al. |
| 2,647,380 A | | 8/1953 | Henry et al. |
| 2,696,719 A | * | 12/1954 | Sklar ....................... F16D 3/08 |
| | | | 464/137 |
| 2,787,328 A | * | 4/1957 | Atkinson ................ E21B 37/02 |
| | | | 15/104.2 |
| 3,000,198 A | * | 9/1961 | Stout ....................... F16D 3/72 |
| | | | 464/175 |
| 3,347,061 A | * | 10/1967 | Stuemky .................. F16D 3/72 |
| | | | 29/436 |
| 3,446,297 A | * | 5/1969 | Elliott ..................... E21B 17/00 |
| | | | 175/301 |
| 3,497,083 A | | 2/1970 | Anderson et al. |
| 3,587,740 A | * | 6/1971 | Block et al. ............ E21B 17/05 |
| | | | 166/227 |
| 3,757,879 A | | 9/1973 | Wilder et al. |
| 3,895,502 A | | 7/1975 | Schwarz |
| 4,055,966 A | | 11/1977 | Fredericks |
| 4,233,820 A | | 11/1980 | Driver |
| 4,449,956 A | | 5/1984 | Ueno |
| 4,487,591 A | * | 12/1984 | Berg ........................ F16D 3/56 |
| | | | 464/137 |
| 4,720,114 A | * | 1/1988 | Braitmaier .............. B23B 31/22 |
| | | | 269/48.1 |
| 4,917,653 A | * | 4/1990 | Collucci .................. F16D 3/58 |
| | | | 464/85 |
| 4,947,942 A | | 8/1990 | Lightle et al. |
| 4,982,801 A | | 1/1991 | Zitka et al. |
| 5,000,723 A | | 3/1991 | Livingstone |
| 5,019,015 A | | 5/1991 | Wasserfuhr |
| 5,048,622 A | | 9/1991 | Ide |
| 5,053,687 A | | 10/1991 | Merlet |
| 5,186,686 A | * | 2/1993 | Staples .................... B64C 27/35 |
| | | | 464/69 |
| 5,330,388 A | * | 7/1994 | Blanding ................. F16D 3/02 |
| | | | 464/106 |
| 5,392,664 A | * | 2/1995 | Gogins .................... F16D 31/06 |
| | | | 74/117 |
| 5,651,737 A | | 7/1997 | Blanc |
| 5,740,699 A | | 4/1998 | Ballantyne et al. |
| 6,155,349 A | | 12/2000 | Robertson et al. |
| 6,676,526 B1 | | 1/2004 | Poster |
| 6,896,473 B2 | | 5/2005 | Schuler |
| 7,004,843 B1 | | 2/2006 | Kerstetter |
| 7,367,772 B2 | | 5/2008 | Khajepour et al. |
| 8,251,938 B1 | | 8/2012 | Morcuende et al. |
| 2011/0048710 A1 | * | 3/2011 | Robichaux .............. E21B 17/05 |
| | | | 166/285 |
| 2011/0162891 A1 | * | 7/2011 | Camp ...................... E21B 7/067 |
| | | | 175/61 |
| 2014/0027185 A1 | | 1/2014 | Menger et al. |
| 2014/0370995 A1 | * | 12/2014 | Collins ................... E21B 17/02 |
| | | | 464/138 |
| 2016/0060970 A1 | | 3/2016 | Pierre et al. |
| 2016/0341255 A1 | | 11/2016 | Kummer et al. |
| 2017/0002871 A1 | | 1/2017 | McMillan et al. |
| 2017/0023068 A1 | | 1/2017 | Maw et al. |
| 2017/0328416 A1 | | 11/2017 | Maw et al. |
| 2017/0370420 A1 | | 12/2017 | Deen et al. |
| 2018/0371839 A1 | * | 12/2018 | Sonar ...................... E21B 4/006 |

FOREIGN PATENT DOCUMENTS

| | | |
|---|---|---|
| FR | 485872 A | 2/1918 |
| GB | 15259 | 8/1890 |
| RU | 2017930 C1 | 8/1994 |
| RU | 2526957 C1 | 8/2014 |
| SU | 700710 | 11/1979 |

OTHER PUBLICATIONS

Final Office Action received from the U.S. Patent and Trademark Office in U.S. Appl. No. 15/160,809, dated Aug. 30, 2017, 12 pages.

International Search Report and Written Opinion received from the International Search Authority in Patent Cooperation Treaty Application No. PCT/US2015/047387, dated Dec. 10, 2015, 8 pages.

Non-Final Office Action received from the U.S. Patent and Trademark Office in U.S. Appl. No. 14/838,155, dated Feb. 17, 2017, 9 pages.

Non-Final Office Action received from the U.S. Patent and Trademark Office in U.S. Appl. No. 15/160,809, dated Dec. 14, 2016, 18 pages.

Non-Final Office Action received from the U.S. Patent and Trademark Office in U.S. Appl. No. 15/195,892, dated Oct. 6, 2017, 9 pages.

Request for Continued Examination and Amendment filed with the U.S. Patent and Trademark Office in U.S. Appl. No. 14/838,155, dated Jan. 4, 2018, 9 pages.

Response to Non-Final Office Action filed with the U.S. Patent and Trademark Office in U.S. Appl. No. 14/838,155, dated Jun. 9, 2017, 6 pages.

Response to Non-Final Office Action filed with the U.S. Patent and Trademark Office in U.S. Appl. No. 15/160,809, dated Jun. 14, 2017, 17 pages.

Response to Restriction Requirement filed with the U.S. Patent and Trademark Office in U.S. Appl. No. 14/838,155, dated Jan. 26, 2017, 1 page.

Restriction Requirement received from the U.S. Patent and Trademark Office in U.S. Appl. No. 14/838,155, dated Oct. 26, 2016, 7 pages.

Request for Continued Examination and Amendment filed with the U.S. Patent and Trademark Office in U.S. Appl. No. 15/160,809, dated Feb. 28, 2018, 14 pages.

* cited by examiner

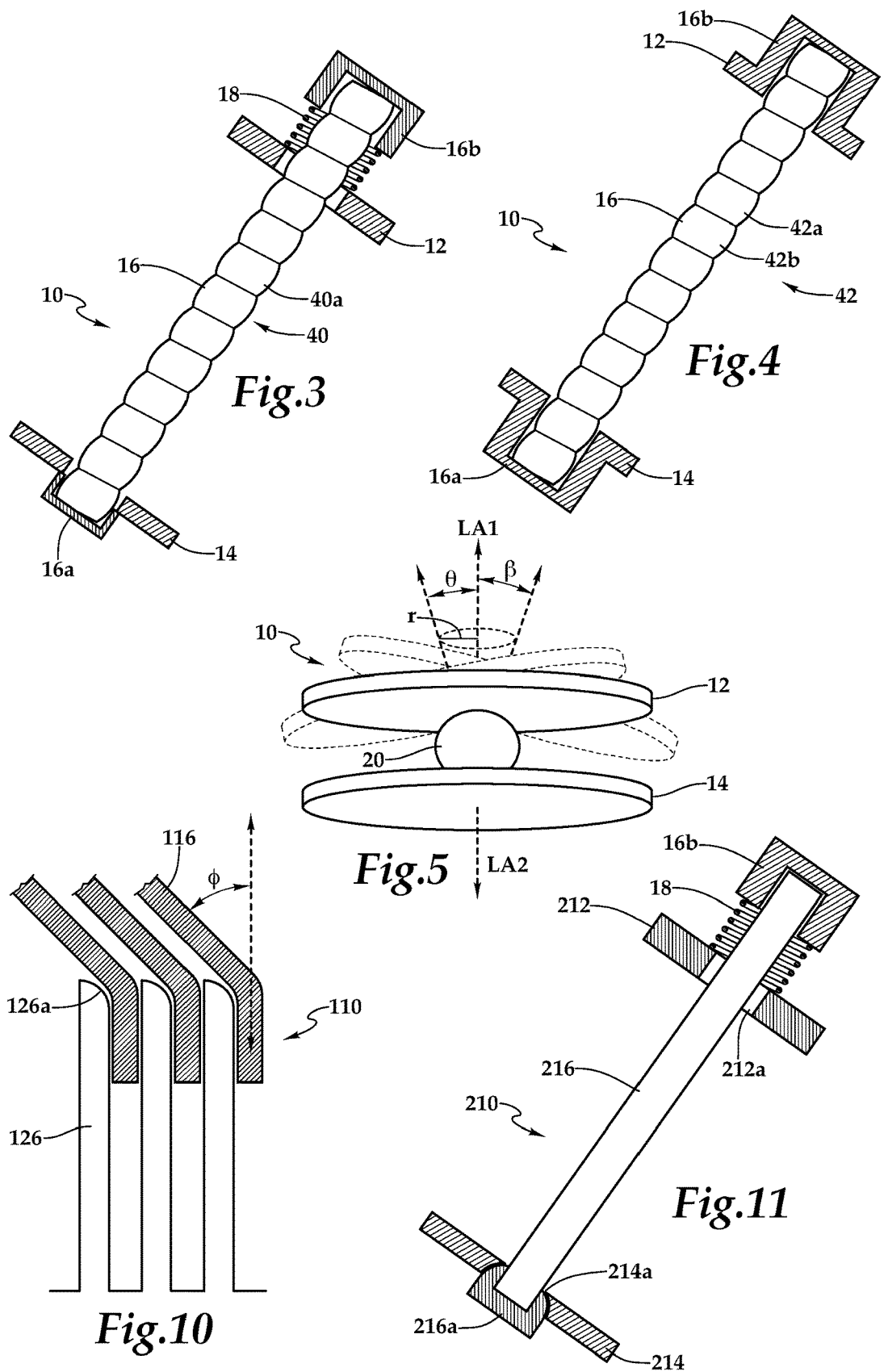

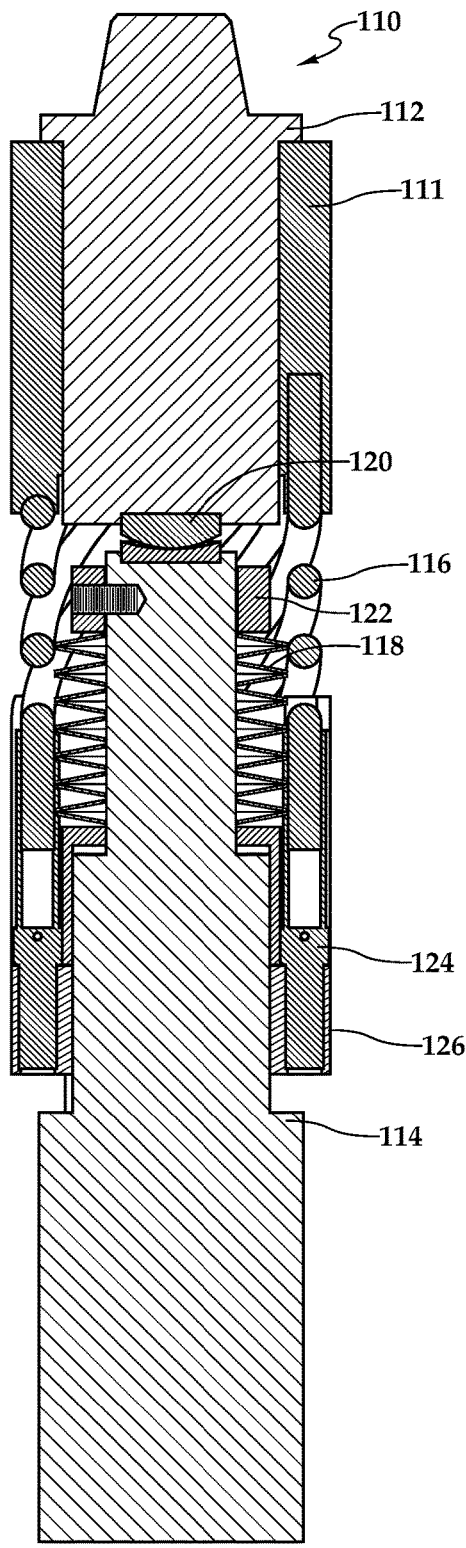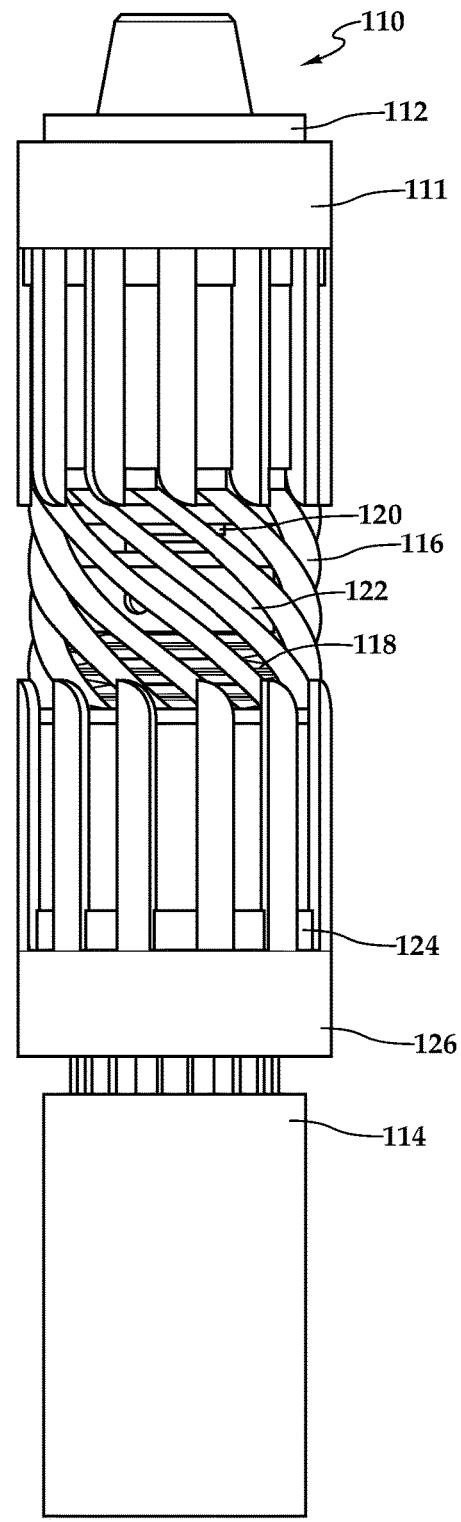
*Fig.6*  *Fig.7*

UNIVERSAL JOINT

RELATED APPLICATION

This application claims the benefit of U.S. Provisional Application No. 62/220,846, filed Sep. 18, 2015, entitled, "Universal Joint," which is incorporated herein in its entirety by reference for all purposes.

FIELD OF THE INVENTION

This invention relates to universal joints for downhole drilling operations.

BACKGROUND OF THE INVENTION

Universal joints are used in mechanical applications to transmit torque between components where there can be misalignment of rotating parts. In a drilling operation, a drill bit is mounted to the end of a drill string. The drill string is rotated from the top of the string or by a motor at the bottom of the string, or both, to rotate the drill bit and advance the borehole. Universal joints are included in the drill string to accommodate rotational eccentricity. The eccentric rotation is converted into axial rotation in order for the drill bit to advance the borehole efficiently. Eccentricity can be initiated by a motor in the drive assembly that rotates the drill bit or by steering of the bit to change direction of the borehole.

FIG. 1 is a schematic representation of a drilling operation 2. In conventional drilling operations, a drill bit 8 is mounted on the end of a drill string 6 comprising drill pipe and drill collars. The pipe sections of the drill string are threaded together at their ends to create a pipe of sufficient length to reach the bottom of the wellbore 4. The drill string may be several miles long. The bit is rotated in the bore either by a motor proximate to the bit or by rotating the drill string or both simultaneously. A pump circulates drilling fluid through the drill pipe and out of the drill bit flushing rock cuttings from the bit and transporting them back up the wellbore. Additional tools and components 10 can be included in the drill string such as motors and vibrators.

The components of the drill string including the universal joint are subjected to extreme torque forces, elevated operating temperatures and abrasive drilling fluids, all of which can have an adverse effect on the operational life of drill string components. Constant relative movement of the components of a universal joint during operations, together with abrasive drilling mud, causes abrasion and erosion of mating components. Attempts have been made to effectively seal the universal joint assemblies so as to prolong their operational life. However, the constant relative movement of the components and aggressive downhole environment leads to difficulties in conventional sealing arrangements. Replacement of the joint or its components requires removal of the drill string from the borehole and downtime for the operation, which increases operational expenses substantially.

A universal joint that requires less space and is less vulnerable to abrasion and erosion with an extended service life would be advantageous.

SUMMARY OF THE INVENTION

The present invention provides a universal joint to be used as part of a downhole drill string. The joint is inexpensive to manufacture with few bearing surfaces, and durable with limited susceptibility to erosion and wear.

In one aspect of the invention, the joint includes upper and lower members connected by a set of links. The links are elongate with opposite ends received by the member around their circumferences. The universal joint accommodates misalignment of shafts connected to the members and transfers torque from one shaft to the other. The joint can in some embodiments provide transmission of thrust as well as torque in a compact assembly that allows the components of the drill string to be positioned closer together shortening the drill string.

In a one embodiment, the connectors are flexible cables terminating at plates. The cable is preferably composed of a plurality of strands with each strand being thin in relation to its length but other cables are possible. The strands are of a flexible material and the cable generally has greater stiffness than the individual strands. This configuration limits abrasion and erosion that normally occurs in conventional downhole universal joints on account of the high forces transmitted through sliding or rotating contact surfaces. A stranded cable is less subject to fretting and spalling at mating surfaces than bearing surfaces.

In another embodiment, a tool with a longitudinal axis transmits torque through flaccid lines spaced from the longitudinal axis.

In another embodiment, a tool with a longitudinal axis transmits torque through axially extending links spaced from a central bearing.

In another embodiment, a universal joint for downhole applications includes two longitudinally spaced members, each terminating ends of a plurality of transversely spaced cables at an outer extent of the members.

In another embodiment, a set of axially extending flaccid lines terminate at first and second member separated by a bearing.

In another embodiment, cables are received through upper and lower members. In another aspect of the invention, the member includes a pin for connecting to drill string components. In another aspect of the invention, a downhole tool assembly includes a positive displacement motor connected to a drill bit by a set of links transversely spaced that converts eccentric rotation to axial rotation to transmit torque to the bit. In another aspect of the invention, the tool includes resilient members to absorb changes in torque. In another aspect of the invention, the plates are maintained in spaced positions by a spacing member. In another aspect of the invention, the spacing member is a ball bearing.

In another aspect of the invention, a service life indicator is visible on the cable providing a gauge of wear, erosion, overstress and/or fatigue. The indicator can include strands of limited dimension or contrasting material properties in relation to adjacent strands incorporated in the cable. In another aspect of the invention, the cable is used in conjunction with a positive displacement motor or a rotational impulse tool. In another aspect of the invention, a universal joint includes a coiled wire about a hollow core. In another aspect of the invention, a universal joint includes a coiled wire about a solid core. In another aspect of the invention, the links are solid members.

BRIEF DESCRIPTION OF THE DRAWINGS

FIG. 3 is a cross section view of the assembly of FIG. 2 at 3-3.
FIG. 4 is a cross section view of an alternative embodiment of the assembly.

FIG. 5 is a schematic of relative movement of the members.

FIG. 6 is a cross section view of the tool.

FIG. 7 is a side view of an alternative embodiment of the tool.

FIG. 10 is a portion of the collar and cables of the tool of FIG. 7.

FIG. 11 is a cross section view of an alternative embodiment of the assembly.

DETAILED DESCRIPTION OF THE PREFERRED EMBODIMENTS

Figure 1:
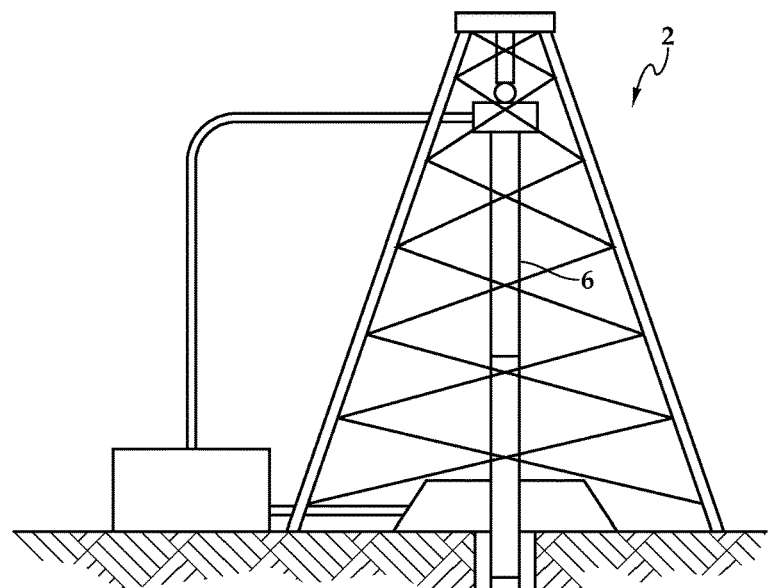
FIG. 1 is a schematic diagram of a drilling operation.
Figure 2:
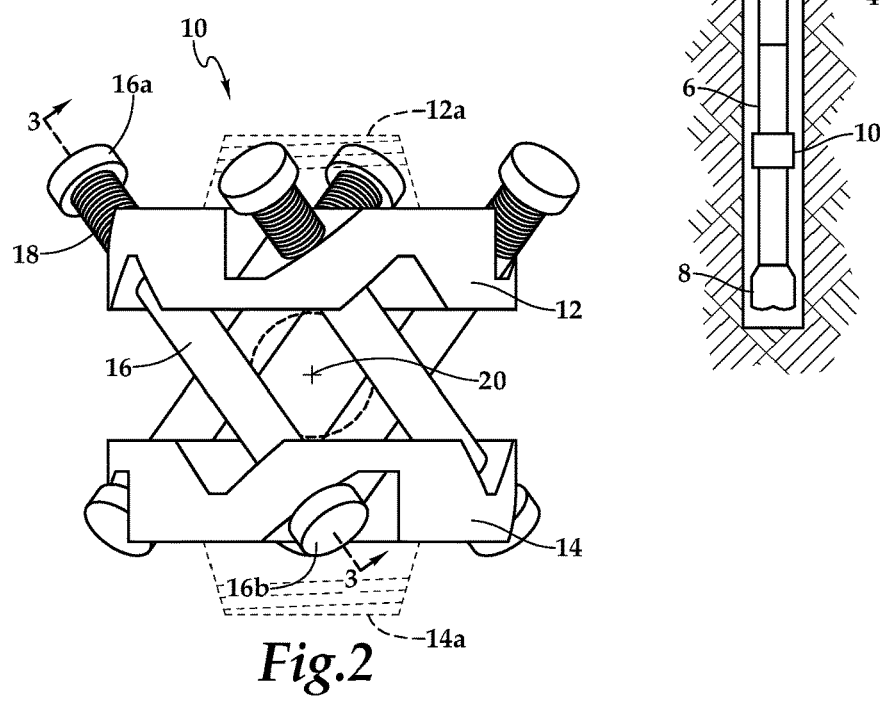
FIG. 2 is a side view of the inventive universal joint.

A drill string in its basic form includes sections of threaded pipe and tools assembled end to end with a drill bit at a distal end for advancing a borehole. The drill string can be miles long and rotated at a proximal end of the pipe by a drilling rig (or otherwise) to turn the drill bit and advance the borehole. There are many different kinds of supplemental components that can be assembled to the drill string to perform a range of functions such as reaming out obstructions from the borehole, widening the borehole or vibrating to limit friction between the string and the borehole.

Positive displacement or mud motors can be installed at the distal end of the drill string to drive the drill bit instead of, or in addition to, driving the drill string from the above ground drill rig. Fluid is pumped down the drill string during operation under pressure to flush material out of the borehole. A mud motor uses the pressure of the fluid to drive a rotor in a stator housing. The output of the motor is eccentric, with the rotor shaft rotating about a circle as well as rotating about its axis. In order to limit the stress on the drill string and bit, one or more universal joints are installed as part of the drill string. The universal joint transmits the torque to the drill bit and converts the eccentric rotational component to axial rotation.

The disclosed universal joint 10 includes upper and lower members 12 and 14 and links or cables 16. Each link can include terminations or end members 16A, 16B. Upper member 12 includes a connector 12A for joining to a drill string or a drill string component. Lower member 14 includes a connector 14A for joining to a drill string or a drill string component. The upper plate receives one end of each link 16 and the lower plate receives the other end of each link. In one embodiment, the upper and lower members are plates and the links are cables which pass through the plates and are retained by the terminations larger than the holes the cables pass through in the plates.

The plates can be generally parallel and spaced from each other. The plates can be held in a spaced relationship by a spacing member 20 between the plates such as a ball bearing or a shaft or other body. The plates and ball bearing can be aligned along a longitudinal axis. The ball bearing can be rigid or can be a resilient material. The cables are transversely spaced from and inclined in relation to the longitudinal axis. The holes in the plates and adjacent mating surfaces on the plate that receive the cables can have an orientation corresponding to the normally inclined orientation of the links.

The assembly transfers torque from a component connected to upper member 12 such as a mud motor, through links 16 to the lower member and to a component attached to the lower member 14 such as a bit. When torque is applied to the upper member, the links are put in tension and exert torque on the lower member. With the members and mating surfaces of the members inclined in the direction of torque, the applied force is generally along the axis of the links. The tension through the inclined members tends to pull the plates together so the members bear on the ball bearing 20. The members can be configured with bearing surfaces, such as recesses, to receive the ball bearing. Links 16 can also experience shear forces as well as tension when torque is applied to the assembly.

The cables can be mounted to the plates with a resilient member 18 such as a spring between the end members and the plate to absorb shock when the torque applied to the assembly increases or decreases rapidly. The connected components may not be completely aligned or may include eccentric rotation such as when the upper component is a mud motor and the lower component is a drill bit. In this case, the output of the rotor of the mud motor includes rotation about an axis of the rotor and rotation in a circle about the axis as well.

In this case the upper plate can rotate with the motion of the rotor and can also move out of perpendicular to the longitudinal axis. Springs 18 between the cable termination and the upper plate provide for the plates to be out of parallel, the upper plate oscillating or nutating, and the lower plate remaining perpendicular to the longitudinal axis. This can convert the eccentric rotation of the upper plate to axial rotation of the lower plate while transferring significant torque to the lower component.

In an alternative configuration, the end members 16A and 16B can be incorporated into the upper and lower plates as a single unit as shown in FIG. 4. The cables can then be anchored directly into the upper and lower plates. The spacing member 20 can be a ball bearing, a spring or other member that maintains separation and relative movement of the plates. Spacing member 20 as a resilient member can at least in part maintain tension in the cables where the upper plate rotates with complex motion.

Cable 16 preferably includes one or more strands. The strands of cable 16 can be parallel or can be braided. There are many braiding techniques and strand lay configurations that are well understood by those skilled in the art. The strands of the cable can be embedded in a matrix but need not be. The strands can be covered by a sleeve that holds some or all of the strands. Cable 16 can include coiled wires consisting of a single strand wound around a hollow core.

In an alternative embodiment, link 16 is a coiled wire consisting of a single strand wound around a core material. The core material can be seated in the terminating members 16A and 16B. Alternatively, the core material can end before the terminating member.

In an alternative embodiment, the link 16 is a flaccid line to transfer torque between components. The flaccid line can be a chain or other structure. Alternatively, the cables 16 can be solid members.

Methods for connecting the terminal fittings 16A and 16B to a cable are well known by those skilled in the art. Methods include inserting a wedge between the end strands of the cable and sliding a tapered sheath over the outside of the wire to compress the wire and wedge. Alternatively, terminal fittings can be swaged to the cable. Alternatively, a termination fitting with a cup can receive the end of a metal cable, and molten metal poured in the cup to bond the metal cable to the cup surface and retain the cable in the cup. Cables that comprise polymer or natural fiber strands can be infiltrated with epoxy in a terminal fitting. Other methods used to terminate the cable are possible. End member connectors can include a threaded coupling, ferrule, eye, thimble or any similar fitting that allows connection of the cable to other tools or components in the drill string.

Figure 8:
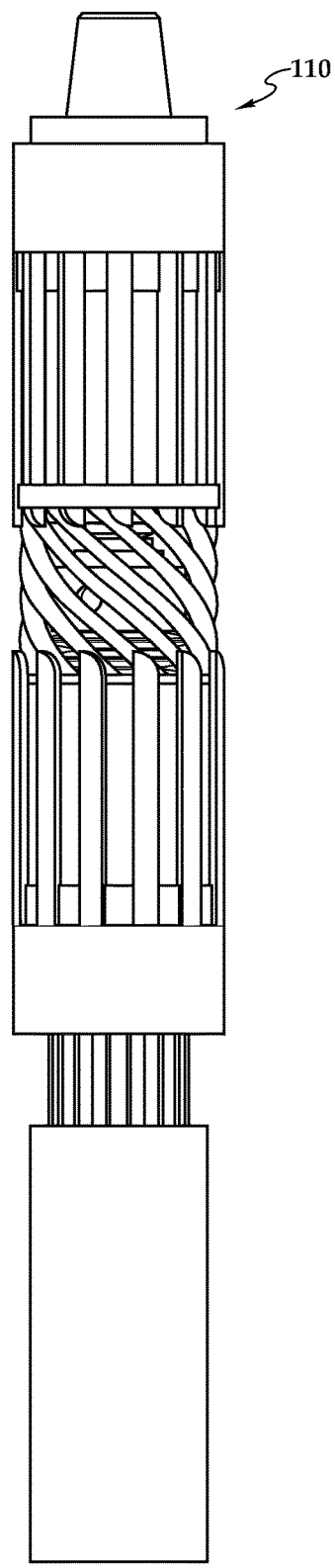
FIG. 8 is a side view of the tool in the torqued position.
Figure 9:
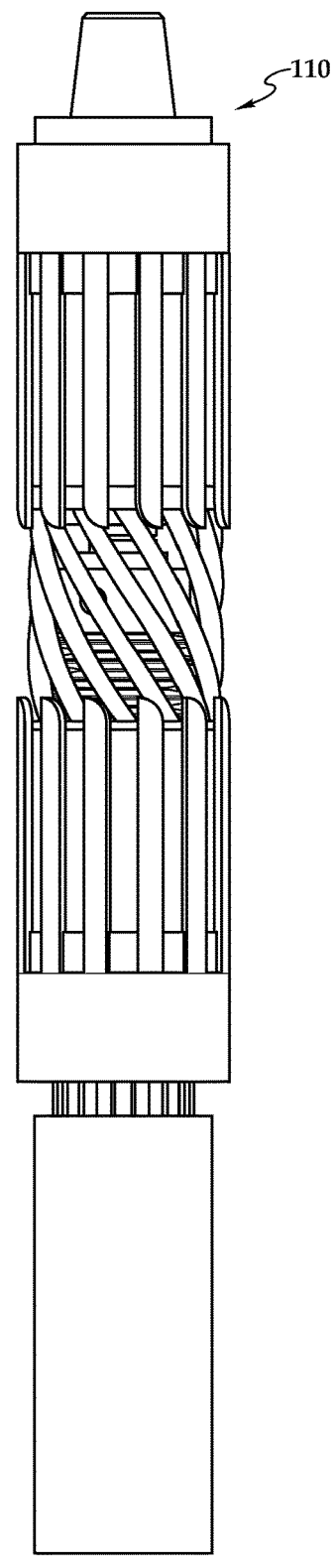
FIG. 9 is a side view of the tool of FIG. 7 in the untorqued position.

Another alternative embodiment of a universal joint 110 is shown in FIGS. 6-10. Tool 110 includes upper member 111 and lower member 126 connected by cables 116. In this embodiment, the upper and lower members are configured as sleeves or collars. The sleeves 111, 126 are fit over an upper shaft 112 and a lower shaft 114. In this embodiment, the lower drive shaft 114 is connected (directly or indirectly) to a drill bit (not shown) or other downhole tool (e.g., a reamer), and the upper drive shaft 112 is connected (directly or indirectly) to a motor (not shown) to drive the drill string. Nevertheless, the tool could be reversed such that the motor drives shaft 114. A bearing 120 between the upper and lower shafts transfers axial force between the shafts while providing for relative angular movement between the members similar to previous embodiments. The upper and lower shafts can rotate in relation to each other on bearing 120 with the sleeves and cables transferring torque between upper and lower shafts.

The lower shaft 114 is shown with splines that receives a similarly splined sleeve 126. The sleeve 126 can slide axially on the lower shaft and spline. A first end of the cables are connected into the collar in spaced relation around the circumference of the tool. The other end of the cables are connected to the upper member. The cables are spaced from a longitudinal axis of the tool. The splined collar 126 translates and extends axially on the lower member in response to tension in the cables and bears on a resilient member 118. The resilient member biases the collar downward on the lower shaft, i.e., away from upper member 111.

Without torque applied to the tool the cables can extend axially. As torque is applied to the upper member it begins to rotate and the cables take on a helical twist with relative rotation between the upper and lower member. The collar 126 is biased downward by the spring 118 against the tension in the cables when torque is applied to upper shaft 112. When upper shaft 112 is driven by a motor, the inclination of the cables increases and pulls the lower collar 126 upward, which compresses the spring against a retaining collar 122 secured to the upper end of the lower shaft 114. As the cables exert torsional force on the lower sleeve 126, the lower sleeve through the engaged splines transfers torque to the lower shaft 114 such that the lower shaft rotates. The splines permit the axial movement required by the further twisting of the cables. Other coupling arrangements between the lower shaft and lower collar could be used to transfer torque while permitting axial movement.

The ends of the cables can be mounted axially to the collar. In taking on the helical twist, the cables bend at an angle $\Phi$ at the interface with the collar. The radius of the bend can be a stress concentration point for the cable. In order to limit stress, the collar may be configured with a transition 126A that allows the cable to bend about the end of the collar with a larger radius of curvature as shown in FIG. 10.

The expected torque capacity is based on the number of wire ropes, the diameter of wire ropes, the wrap angle around the cylinder and the tension force on the rope. The material(s) for individual strands are selected to allow the cable to deflect and/or flex to accommodate the eccentric rotation. In a downhole drilling operation, the upper shaft 12 generally rotates about an upstream axis LA1 while the lower shaft 14 generally rotates about a downstream axis LA2. While neither member exhibits ideal rotation about an axis, the upstream member typically tends to have a greater offset so as to generally orbit about upstream axis LA1. The upstream shaft 12 can deflect or translate transversely and be offset from the downstream member. The upstream axis LA1 may be parallel to or inclined to the downstream axis LA2 as shown in FIG. 5.

When the upstream axis LA1 is inclined to the downstream axis LA2, rotation can be measured as the angular deflection "$\beta$" of the longitudinal axis LA1 of the upper member in relation to the longitudinal axis LA2 of the lower member. Transverse deflection of the upper member 12 can be measured as a distance r. The upper member can also have eccentric rotation in relation to the lower member with axis LA1 making an angular deflection "$\Theta$" about the axis LA2 at a distance r. In a typical application where the joint 10 connects two misaligned pieces of machinery with rotating portions, the angle $\beta$ can be constant while the angle $\Theta$ sweeps zero to 360 degrees.

Where the cable strands are braided, torque and axial forces applied to the cable can result in a complex combination of forces in the individual strands. The lay of the braid can be selected to optimize the function of the cable in a specific application such as maintaining stiffness of the cable under a specific torque and/or thrust.

Material used for the links is matched to the expected flexural forces, torque and axial thrust force expected in the application. The link material can be one or more material selected from the group of metals, synthetic fibers or natural fibers and can include steel, copper alloys, Kevlar®, nylon, stainless steel, polymers or other materials. A cable can include strands of different materials with contrasting material properties. The material properties of the strands can vary along their length to optimize properties of the cable. For example, the strands can be thicker at the ends or can be stiffer at the end portions than in the middle portion of the cable. Alternatively, the strands can taper extending from one end to the other end so the cable is thicker at one end.

In an alternative embodiment, the links are rigid members with limited flexibility. FIG. 11 is a cross section view of a link 216. The upper end of the link is terminated in a similar manner to previous embodiments with a link termination 16B and a resilient member 18 that bears on the upper member 212 and the terminating connector. The lower end of the link has a link termination 216A with a rounded bearing surface. The rounded bearing surface is received in an opening 214A of the lower member 214. The opening has a corresponding rounded shape so that the terminating connector can pivot in relation to the lower member on the rounded bearing surface of the opening as the joint operates. The opening 212A of upper member 212 may be tapered or beveled or oversized to allow the upper end of the link to move without interference as the tool operates.

Link 216 can be a solid plastic, metal, ceramic or other material. Alternatively, link 216 can be a tube. Alternatively, link 216 can include a solid core with a strands or coils along the outside surface. Alternatively, link 216 can be a tube with a solid center of a different material or a tube with strands inside the tube.

The universal joint in operation is typically part of an assembly inside an outer casing of the drill string with other components such as the mud motor. In some embodiments, the assembly may be extracted from the inside of the drill string and brought to the surface as a separate unit.

The link or cable 16 of universal joint 10 can include a service life indicator 40 (SLI) that displays a gauge of remaining service life for the component. The indicator can allow the operator to replace the universal joint before a downhole failure. Materials repeatedly flexed are subject to fatigue failure from hardening, or other material degradation such as embrittlement, and can fracture. In one embodiment the service life indicator is a fatigue indicator. The fatigue indicator can be a strand 40A integrated with strands of the cable 16 that flexes with the cable in service (FIG. 3). The fatigue indicator strand 40A has a configuration or is a material selected to be more vulnerable to fatigue stress than the balance of the strands.

For example, the fatigue indicator strand can be selected to have a service life 80% of the life of other strands or the cable. Reduced service life of the fatigue indicator may be a factor of the dimensions of the indicator, accelerated work hardening of the material or a harder material as compared to the balance of the strands of the cable. At 80% of the service life, the wear indicator develops visible failure mechanisms such as thinning, cracking or other visible indicia that can be detected by the operator. The universal joint or the cable can be removed from service before the cable fails in response to visual inspection of the fatigue indicator.

Components of a drill string are in contact with suspended particles of the drilling fluid that are abrasive and erode the components. Flexure of the cable can result in the adjacent strands cyclically sliding against each other. Particles between the strands abrade and erode the adjacent surfaces. In one embodiment a service life indicator 42 is a wear or erosion indicator. The wear indicator can include a strand 42A included in the cable stack thinner than adjacent strands (FIG. 4). Erosion of the strand 42A to a critical thickness can be visually detected by the operator. Alternatively, the erosion indicator can be a similar thickness to adjacent strands but of a material that erodes at a higher rate than adjacent strands. Alternatively, the erosion indicator can be a coating on a solid link 16.

In downhole applications the forces experienced by the universal joint may exceed predicted ranges which can limit the service life. For example, where the drill string experiences stick slip conditions the bit can seize in the borehole and torque builds up in the drill string subjecting the joint to excess torque. Early failure of the component due to excessive torque can require unplanned extraction of the drill string from the hole incurring substantial expense.

The cable 16 of universal joint 10 can include an overstress indicator 42. In one embodiment of an overstress indicator, cable 16 includes strands 42A and 42B. These strands may fail at a lower applied stress level than adjacent strands. If in operation the joint experiences torque above the specified torque, one or both strands break. One or both strands breaking can indicate the magnitude of excess torque. Alternatively, the overstress indicator can be a coating on a solid link 16.

A service life indicator may incorporate several types of failure mechanism indicators in a single component. The service life indicator may be distinguished from other portions of the cable by color or may be spaced from adjacent components.

The universal joint disclosed above is inexpensive to manufacture, is a single component without bearing surfaces and is durable with limited erosion and wear susceptibility. The joint can include service life indicators that allow the operator to replace the unit before operational failure.

It should be appreciated that although selected embodiments of the representative universal joints are disclosed herein, numerous variations of these embodiments may be envisioned by one of ordinary skill that do not deviate from the scope of the present disclosure. The disclosure set forth herein encompasses multiple distinct inventions with independent utility. The various features of the invention described above are preferably included in each universal joint. Nevertheless, the features can be used individually in a joint to obtain some benefits of the invention. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed.

What is claimed is:

1. A universal joint for transmitting torque from one shaft to another shaft, the joint comprising:
    a first member for coupling with a first shaft, the first member having a first axis of rotation coincident with the axis of rotation of the first shaft when coupled with the first shaft;
    a second member for coupling with a second shaft, the second member, when coupled with the second shaft, having a second axis of rotation coincident with the axis of rotation of the second shaft;
    a spacer for separating the first and second shafts in a spaced relationship; and
    a plurality of links, each including a first end, a second end, and a middle portion between the first end and the second end, the first end of each of the plurality of links being coupled to the first member at a first position displaced radially from the first axis, and the second end being connected to the second member at a second position displaced radially from the second axis, wherein the first position and the second position are axially and rotationally displaced from each other such that, when no torque is applied, at least the middle portion of each of the plurality of links is inclined relative to the first axis.

2. The universal joint of claim 1, wherein each of the plurality of links is connected to at least one of the first member or the second member with a resilient terminating member.

3. The universal joint of claim 1, wherein the first and the second members each have fixed positions relative to the first and second shafts, respectively.

4. The universal joint of claim 1, wherein the second member comprises a sleeve that slides axially with respect to the second shaft but rotates with the shaft, and is resiliently biased away from the first member.

5. The universal joint of claim 1, wherein the spacer has at least one set of complementary bearing surfaces for permitting rotation and articulation of the first and second member with respect to each other.

6. The universal joint of claim 5, wherein the the at least one set of complementary bearing surfaces comprise a spherical surface and a complementary surface.

7. The universal joint of claim 5, wherein the spacer comprises a ball bearing and the first and the second members have surfaces for receiving the ball.

8. The universal joint of claim 1, wherein the spacer comprises a resilient material.

9. The universal joint of claim 1, wherein the spacer comprises a solid material.

10. The universal joint of claim 1, wherein each of the plurality of links comprises a cable.

11. The universal joint of claim 10, wherein the cable that comprises a plurality of strands of flexible material and is less flexible than each of the individual strands.

12. The universal joint of claim 1, wherein each of the links comprises a coiled wire.

13. The universal joint of claim 12, wherein the coiled wire is wrapped around a material core.

14. The universal joint of claim 1, wherein each of the plurality of links comprises a chain.

15. The universal joint of claim 1, wherein each of the plurality of links comprises a solid member.

16. The universal joint of claim 1, wherein each of the plurality of links is connected to the second member by a pivoting terminating connector such that the plurality of links are pivotable after connected to the second member.

17. The universal joint of claim 1, wherein the first member comprises one of a plate or a sleeve connected with a rotating shaft.

18. The universal joint of claim 1, wherein the first member is coupled to one of a source of torque or a drill bit, and the second member is coupled to the other of the source of torque and the drill bit.

19. The universal joint of claim 1, wherein a source of torque is one of a positive displacement motor or a rotational impulse tool.

20. The universal joint of claim 1, wherein each of the plurality of links comprises a cable and service life indicator visible on the cable.

21. The universal joint of claim 20, wherein the service life indicator comprises strands of limited dimension or contrasting material properties in relation to adjacent strands from which the cable is fabricated.

22. A universal joint for transmitting torque from a source of torque to a drill bit, comprising:
  a first member having a first axis of rotation coincident with the axis of rotation of a first shaft when connected to the first shaft;
  a second member for coupling with a second shaft, the second member, when coupled with the second shaft, having a second axis of rotation coincident with the axis of rotation of the second shaft;
  a spacer for separating the first and second shafts in a spaced relationship;
  a plurality of links, each including a first and a second end, the first end of each of the plurality of links being coupled to the first member at a position displaced radially from the first axis, and the second end being connected to the second member at a position displaced radially from the second axis; and
  at least one resilient member to absorb changes in torque transferred to the plurality of links, wherein the second member comprises a sleeve that slides axially with respect to the second shaft but rotates with the shaft, and wherein the at least one resilient member biases the sleeve away from the first member.

23. The universal joint of claim 22, wherein the spacer comprises a bearing, and wherein the bearing comprises a spherical surface and a complementary surface.

24. A drill string for drilling a borehole with a drill bit, comprising:
  a drill pipe;
  a motor or a rotary impact tool for producing torque connected to the drill pipe;
  a drill bit; and
  a universal joint for transmitting torque from a source of torque to a drill bit, the universal joint comprising:
    a first member for coupling with a first shaft, the first member, when coupled with the first shaft, having a first axis of rotation coincident with the axis of rotation of the first shaft;
    a second member for coupling with a second shaft, the second member, when coupled with the second shaft, having a second axis of rotation coincident with the axis of rotation of the second shaft;
    a spacer for separating the first and second shafts in a spaced relationship;
    a plurality of links, each including a first, a second end, and a middle portion between the first end and the second end, the first end of each of the plurality of links being coupled to the first member at a first position displaced radially from the first axis, and the second end being connected to the second member at a second position displaced radially from the second axis, wherein the first position and the second position are axially and rotationally displaced from each other such that, when no torque is applied, at least the middle portion of each of the plurality of links is inclined relative to the first axis; and
    at least one resilient member to absorb changes in torque transferred to the plurality of links.

25. The universal joint of claim 1, further comprising:
  at least one resilient member slidably coupled to each of the plurality of links to absorb changes in torque transferred to the plurality of links.

26. The universal joint of claim 22, wherein the sleeve comprises a splined sleeve.

* * * * *

UNITED STATES PATENT AND TRADEMARK OFFICE
CERTIFICATE OF CORRECTION

PATENT NO. : 10,337,261 B2
APPLICATION NO. : 15/268618
DATED : July 2, 2019
INVENTOR(S) : Jason Maw, Beau J. St. Pierre and Nikolai Kummer Page 1 of 1

It is certified that error appears in the above-identified patent and that said Letters Patent is hereby corrected as shown below:

On the Title Page

In the Inventors item (72): Delete "Beaumont, CA (US)" and insert -- Beaumont (CA) --.

Signed and Sealed this
Third Day of September, 2019

Andrei Iancu
*Director of the United States Patent and Trademark Office*